(12) United States Patent
Saito et al.

(10) Patent No.: US 6,773,850 B2
(45) Date of Patent: Aug. 10, 2004

(54) SHOCK-ABSORBING STRUCTURE OF BATTERY COVER

(75) Inventors: Satoshi Saito, Shizuoka (JP); Tomohiro Ikeda, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 173 days.

(21) Appl. No.: 09/863,458

(22) Filed: May 24, 2001

(65) Prior Publication Data

US 2001/0049056 A1 Dec. 6, 2001

(30) Foreign Application Priority Data

May 25, 2000 (JP) .................................... P.2000-155232

(51) Int. Cl.$^7$ .............................. H01M 2/10; H01M 2/04
(52) U.S. Cl. ...................... 429/175; 180/68.5; 429/178
(58) Field of Search .......................... 429/1, 163, 175, 429/177–181; 180/68.5

(56) References Cited

U.S. PATENT DOCUMENTS

| | | | |
|---|---|---|---|
| 3,653,974 A | | 4/1972 | Brosilow et al. |
| 3,961,988 A | * | 6/1976 | Andreoff ..................... 429/175 |
| 4,400,449 A | * | 8/1983 | Henk ........................... 429/59 |
| 4,857,422 A | | 8/1989 | Stocchiero |
| 5,492,779 A | * | 2/1996 | Ronning ...................... 429/120 |
| 5,800,942 A | * | 9/1998 | Hamada et al. ............. 429/148 |
| 6,275,003 B1 | * | 8/2001 | Marukawa et al. ......... 320/116 |

FOREIGN PATENT DOCUMENTS

| | | | |
|---|---|---|---|
| DE | 17 11 340 | 10/1955 | |
| DE | 18 04 760 | 1/1960 | |
| JP | 5-23721 | 3/1993 | ............ H02G/3/04 |

* cited by examiner

Primary Examiner—Patrick Ryan
Assistant Examiner—Tracy Dove
(74) Attorney, Agent, or Firm—Sughrue Mion, PLLC (57) ABSTRACT

A plurality of shock-absorbing ribs for protecting batteries are formed on an outer surface of the cover. The plurality of ribs are arranged parallel to each other. The plurality of ribs may be crossed in a lattice-like manner. Shock-absorbing projections each for abutting against a fixing member, engaged with the battery electrode, are formed on an inner surface of the cover. The projection has an annular shape, and a distal end portion of the electrode is received in the projection. A gap between the projection and the fixing member is smaller than a gap between the electrode and the cover. The plurality of ribs and the projections are disposed substantially symmetrically. The plurality of ribs are interconnected by bulge portions.

19 Claims, 11 Drawing Sheets

SHOCK-ABSORBING STRUCTURE OF BATTERY COVER

BACKGROUND OF THE INVENTION

1. Field of the Invention

The present invention relates to a shock-absorbing structure of a battery cover designed to protect battery electrodes and so on in a battery connecting plate (which serially connects together batteries of a vehicle such as an electric car etc.) at the time of a vehicle collision.

The present application is based on Japanese Patent Application No. 2000-155232, which is incorporated herein by reference.

2. Description of the Related Art

In a power source for a vehicle such as an electric car, a hybrid car (powered by electricity and gasoline), etc., a plurality of batteries are serially connected together to provide a battery block (battery assembly), and then opposite ends of this battery block are covered with covers or the like, and this power source device is mounted within a vehicle body.

Figure 12:
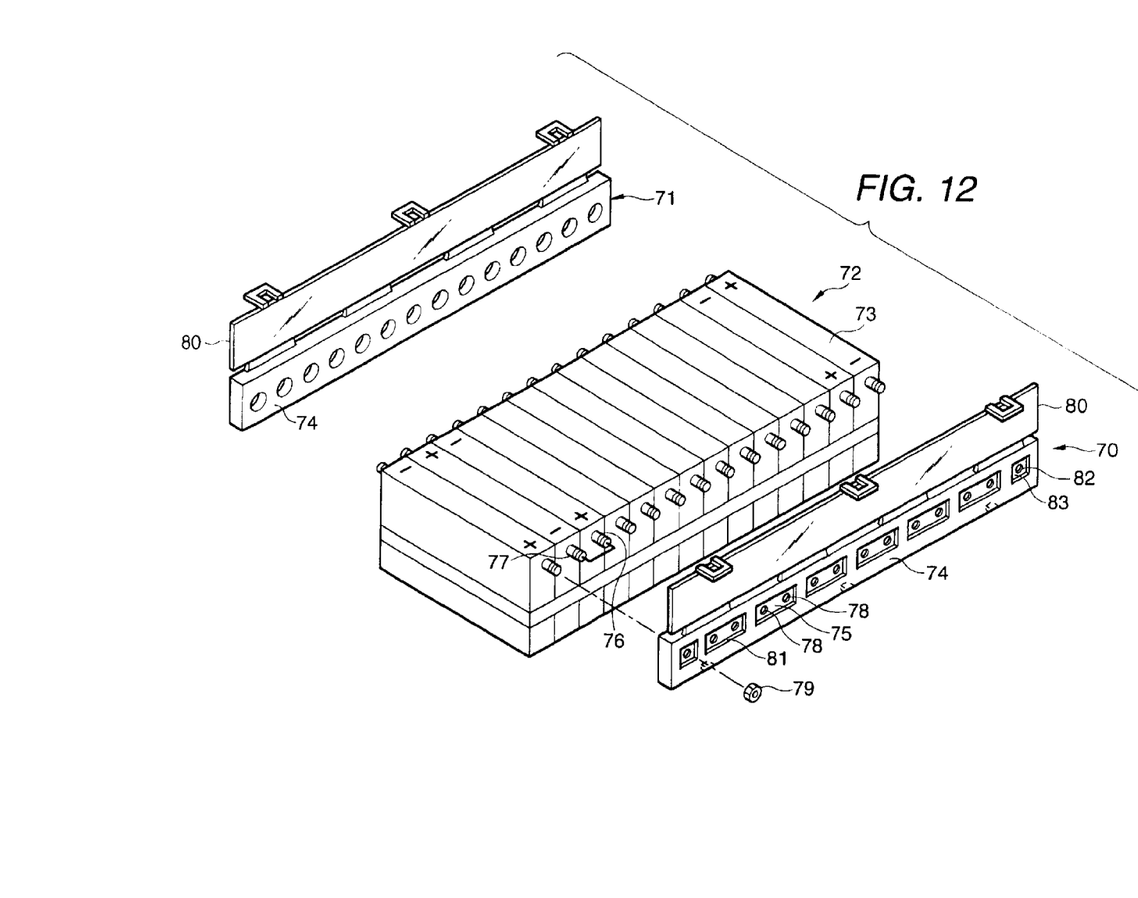
FIG. 12 is an exploded, perspective view showing a battery-connecting plate, including a related cover and a related casing, and a battery block.

FIG. 12 shows one form of a battery connecting plate for connecting a plurality of batteries together.

The battery connecting plates 70 and 71 are attached to opposite ends of a battery block 72, respectively, and each of these battery connecting plates has a plurality of juxtaposed bus bars 75 (made of electrically-conductive metal) mounted on an elongate casing (plate body) 74 made of a synthetic resin.

Each of the bus bars 75 has two insertion holes 78 for respectively passing externally-threaded-type positive and negative electrodes 76 and 77 of the corresponding adjacent batteries 73 therethrough, and these bus bars 75 are fixedly secured to the casing 74 by press-fitting, insert-molding or other ways. Each of the electrodes 76 and 77 is connected and fastened to the bus bar 75 by a nut 79.

Bus bars 83, each having one insertion hole 82, are fixedly secured respectively to opposite ends of the front battery connecting plate 70. The positive electrode 76 of the battery 73, disposed at one end portion of the battery block 72, and the negative electrode 77 of the battery 73, disposed at the other end of the battery block 72, are connected respectively to power wires (not shown), each having a terminal, through the respective bus bars 83.

A cover 80 is pivotably mounted on the casing 74, and when the cover 80 is closed, the bus bars 75 and 83, the electrodes 76 and 77 and the nuts 79 within receiving portions 81 are protected by this cover.

Figure 13:
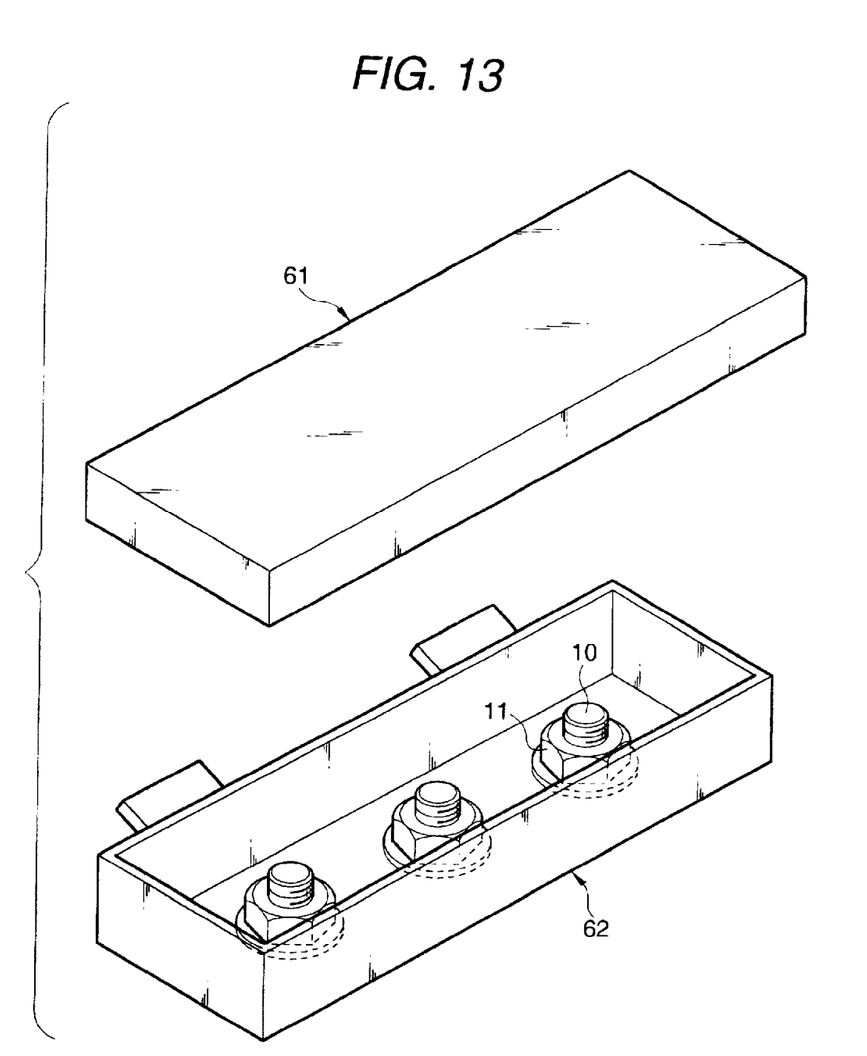
FIG. 13 is an exploded, perspective view showing the other related examples of a cover and a casing.

In the above structure, the cover 80 is formed integrally with the casing 74 through hinges. However, as shown in FIG. 13, there is also the case where there are provided a cover 61 and a casing 62 which are separate from each other, and are made of a synthetic resin. In either case, the cover 61, 80 is fixed to the casing 62, 74 by retaining members etc.

In FIG. 13, reference numeral 10 denotes an externally-threaded-type electrode of a battery (not shown), and reference numeral 11 denotes a nut for connecting the electrode 10 to a bus bar or the like.

Figure 14:
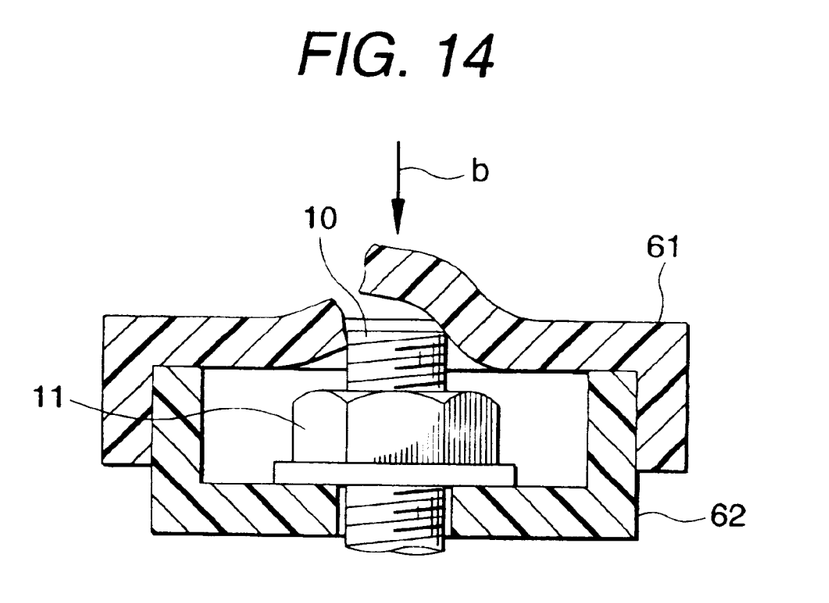
FIG. 14 is a cross-sectional view of the structure shown in FIG. 13 in an assembled condition, and illustrates a problem raised thereby.

In the above structure, however, when a large external force b was applied to the cover 61, for example, at the time of a vehicle collision, the cover 61 was broken, and besides an impact was transmitted to the electrodes 10 and bus bars within the casing 62, so that for example as shown in FIG. 14 the distal ends of the electrodes 10 broke through the cover 61 to project to the exterior. This resulted in possibilities that the batteries were short-circuited, which was dangerous, and that the batteries were adversely affected.

In the case of increasing the strength of the cover 61 by increasing the wall thickness of this cover in order to deal with the above problems, the weight of the cover 61 increased, and the resin moldability thereof was affected, and the cost increased. And besides, there was a chance that abnormal sounds were produced because of the increased inertia force of the cover 61 due to vibrations of the vehicle. Furthermore, a large cost was needed for developing a special material of shock-relieving properties, which resulted in a problem that the cost of the cover 61 itself increased.

SUMMARY OF THE INVENTION

With the above problems in view, it is an object of the present invention to provide a shock-absorbing structure of a battery cover which can easily and positively absorb and relieve an external impact at low costs, and prevents the projecting of battery electrodes from the cover, and will not adversely affect the parts inside the cover.

To achieve the above object, according to a first aspect of the present invention, there is provided a shock-absorbing structure of a battery cover, which comprises a battery cover which protects at least one battery, and a plurality of shock-absorbing ribs formed on an outer surface of the battery cover.

In accordance with the first aspect of the present invention, the plurality of ribs on the cover are crushed at the time of a vehicle collision, so that an impact is absorbed, and the breakage of the cover except the ribs is prevented. Therefore, the electrodes of the batteries, the bus bars, the terminals and so on within the cover are protected from the external force or impact. Particularly, the externally-threaded-type electrodes of the batteries will not break through the cover, and therefore the short-circuiting of the batteries is avoided. And besides, the plurality of ribs are provided instead of increasing the wall thickness of the cover as in the structure of the related art, and therefore the cover has a lightweight design, and the resin molding of the cover is easy, and the cover is produced at low costs.

According to a second aspect of the present invention, it is preferable that the plurality of ribs are arranged parallel to each other.

In accordance with the second aspect of the present invention, the plurality of ribs are arranged parallel to one another, and therefore an impact is absorbed efficiently, and the transmission of the impact to the parts within the cover is suppressed more effectively.

According to a third aspect of the present invention, it is preferable that the plurality of ribs are crossed in a lattice-like manner.

In accordance with the third aspect of the present invention, an impact, applied in every direction (for example, an impact applied obliquely to the rib), can be efficiently absorbed, and the parts within the cover is more positively protected.

According to a fourth aspect of the present invention, the shock-absorbing structure may further comprise at least one fixing member engaged with an electrode of the at least one battery, and at least one projection which is formed on an inner surface of the battery cover and can abut against the at least one fixing member.

In accordance with the fourth aspect of the present invention, at the time of a vehicle collision, the projection on the cover abuts against the fixing member, mounted on the electrode, that is, bent or crushed, thereby absorbing an impact, so that the electrode is prevented from breaking through the cover. The projections are provided instead of increasing the wall thickness of the cover as in the structure of the related art, and therefore the cover has a lightweight design, and the resin molding of the cover is easy, and the cover is produced at low costs.

Moreover, at the time of a vehicle collision, an impact is more positively absorbed by the synergetic effect of the ribs and the projection, and therefore the protection of the parts within the cover is achieved more positively. The ribs and the projections are formed on the cover, and therefore the cover has a lightweight design as compared with the structure of the related art in which the cover has an increased wall thickness. And besides, the molding of the cover is easy, and the cost of the cover is produced at low costs.

According to a fifth aspect of the present invention, it is preferable that the at least one projection has an annular shape to form a hollow portion therein, and a distal end portion of the electrode is received in the hollow portion of the at least one projection.

In accordance with the fifth aspect of the present invention, a plurality of the projections may have an annular shape, and therefore the projection is spread outwardly or compressed uniformly upon application of an impact, thereby absorbing the impact more efficiently. Therefore, adverse effects on the interior of the cover are further reduced. The distal end portion of the electrode is received in the annular projection, and therefore the protection and insulation of the electrodes are enhanced both before and after a collision.

According to a sixth aspect of the present invention, it is preferable that a gap between the at least one projection and the at least one fixing member is smaller than a gap between the electrode and the battery cover.

In accordance with the sixth aspect of the present invention, the projection first abuts against the fixing member to absorb an impact, so that the distal end of the electrode strikes against the cover with a weakened force, or hardly comes into contact with the cover. Accordingly, the electrode is positively protected, and the electrode is positively prevented from breaking through the cover. Therefore, the short-circuiting at the time of a collision is positively prevented.

According to a seventh aspect of the present invention, it is preferable that the plurality of ribs and the at least one projection are disposed substantially symmetrically with respect to a plane of the battery cover.

In accordance with the seventh aspect of the present invention, at the time of a collision, an impact can be positively absorbed simultaneously by the ribs and the projection, and the protection of the interior of the cover is achieved more positively.

According to an eighth aspect of the present invention, it is preferable that the plurality of ribs are interconnected by at least one bulge portion formed on the battery cover.

In accordance with the eighth aspect of the present invention, the bending strength of the ribs increases, and the ribs will not be bent, but are properly crushed at the time of a collision. Even when an impact is applied in an oblique direction, the ribs will not be bent, but are properly compressed (crushed), and an impact in every direction can be dealt with. The bulge portion is crushed together with the ribs, and therefore the shock-absorbing force is enhanced, and a higher impact can be dealt with.

According to a ninth aspect of the present invention, it is preferable that the at least one bulge portion and the plurality of ribs project substantially to the same height.

In accordance with the ninth aspect of the present invention, the at least one bulge portion can be crushed together with the ribs to absorb the impact more effectively.

Alternatively, to achieve the above object, according to a tenth aspect of the present invention, instead of the first aspect, there may be provided a shock-absorbing structure of a battery cover, which comprises a battery cover which protects at least one battery, at least one fixing member engaged with an electrode of the at least one battery, and at least one projection which is formed on an inner surface of the battery cover and can abut against the at least one fixing member.

In accordance with the tenth aspect of the present invention, similar to the fourth aspect, at the time of a vehicle collision, the projection on the cover abuts against the fixing member, mounted on the electrode, and is deformed, that is, bent or crushed, thereby absorbing an impact, so that the electrode is prevented from breaking through the cover. The projections are provided instead of increasing the wall thickness of the cover as in the structure of the related art, and therefore the cover has a lightweight design, and the resin molding of the cover is easy, and the cover is produced at low costs.

According to an eleventh aspect of the present invention, it is preferable that the at least one projection has an annular shape to form a hollow portion therein, and a distal end portion of the electrode is received in the hollow portion of the at least one projection.

In accordance with the eleventh aspect of the present invention, similar to the fifth aspect, a plurality of the projections may have an annular shape, and therefore the projection is spread outwardly or compressed uniformly upon application of an impact, thereby absorbing the impact more efficiently. Therefore, adverse effects on the interior of the cover are further reduced. The distal end portion of the electrode is received in the annular projection, and therefore the protection and insulation of the electrodes are enhanced both before and after a collision.

According to a twelfth aspect of the present invention, it is preferable that a gap between the at least one projection and the at least one fixing member is smaller than a gap between the electrode and the battery cover.

In accordance with the twelfth aspect of the present invention, similar to the sixth aspect, the projection first abuts against the fixing member to absorb an impact, so that the distal end of the electrode strikes against the cover with a weakened force, or hardly comes into contact with the cover. Accordingly, the electrode is positively protected, and the electrode is positively prevented from breaking through the cover. Therefore, the short-circuiting at the time of a collision is positively prevented.

According to a thirteenth aspect of the present invention, it is preferable that the shock-absorbing structure may further comprise a plurality of shock-absorbing ribs formed on an outer surface of the battery cover.

In accordance with the thirteenth aspect of the present invention, similar to the first aspect, the plurality of ribs on the cover are crushed at the time of a vehicle collision, so that an impact is absorbed, and the breakage of the cover except the ribs is prevented. Therefore, the electrodes of the batteries, the bus bars, the terminals and so on within the cover are protected from the external force or impact. Particularly, the externally-threaded-type electrodes of the batteries will not break through the cover, and therefore the short-circuiting of the batteries is avoided. And besides, the plurality of ribs are provided instead of increasing the wall thickness of the cover as in the structure of the related art, and therefore the cover has a lightweight design, and the resin molding of the cover is easy, and the cover is produced at low costs.

Moreover, at the time of a vehicle collision, an impact is more positively absorbed by the synergetic effect of the ribs and the projection, and therefore the protection of the parts within the cover is achieved more positively. The ribs and the projections are formed on the cover, and therefore the cover has a lightweight design as compared with the structure of the related art in which the cover has an increased wall thickness. And besides, the molding of the cover is easy, and the cost of the cover is produced at low costs.

According to a fourteenth aspect of the present invention, it is preferable that the plurality of ribs are arranged parallel to each other.

In accordance with the fourteenth aspect of the present invention, similar to the second aspect, the plurality of ribs are arranged parallel to one another, and therefore an impact is absorbed efficiently, and the transmission of the impact to the parts within the cover is suppressed more effectively.

According to a fifteenth aspect of the present invention, it is preferable that the plurality of ribs are crossed in a lattice-like manner.

In accordance with the fifteenth aspect of the present invention, similar to the third aspect, an impact, applied in every direction (for example, an impact applied obliquely to the rib), can be efficiently absorbed, and the parts within the cover is more positively protected.

According to a sixteenth aspect of the present invention, it is preferable that the plurality of ribs and the at least one projection are disposed substantially symmetrically with respect to a plane of the battery cover.

In accordance with the sixteenth aspect of the present invention, similar to the seventh aspect, at the time of a collision, an impact can be positively absorbed simultaneously by the ribs and the projection, and the protection of the interior of the cover is achieved more positively.

According to a seventeenth aspect of the present invention, it is preferable that the plurality of ribs are interconnected by at least one bulge portion formed on the battery cover.

In accordance with the seventeenth aspect of the present invention, similar to the eighth aspect, the bending strength of the ribs increases, and the ribs will not be bent, but are properly crushed at the time of a collision. Even when an impact is applied in an oblique direction, the ribs will not be bent, but are properly compressed (crushed), and an impact in every direction can be dealt with. The bulge portion is crushed together with the ribs, and therefore the shock-absorbing force is enhanced, and a higher impact can be dealt with.

According to an eighteenth aspect of the present invention, it is preferable that the at least one bulge portion and the plurality of ribs project substantially to the same height.

In accordance with the eighteenth aspect of the present invention, similar to the ninth aspect, the at least one bulge portion can be crushed together with the ribs to absorb the impact more effectively.

DETAILED DESCRIPTION OF THE PREFERRED EMBODIMENTS

A preferred embodiment of the present invention will now be described in detail with reference to the drawings.

Figure 1:
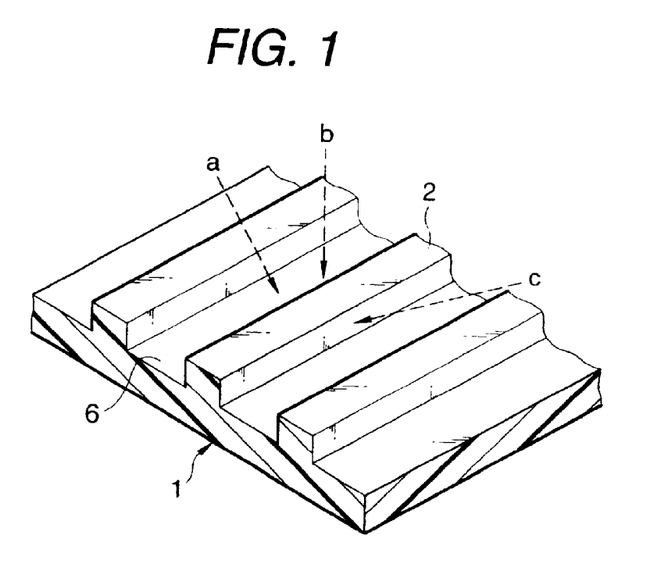
FIG. 1 is a partly cross-sectional, perspective view of a shock-absorbing structure of a battery cover forming a first embodiment of the present invention.
Figure 2:
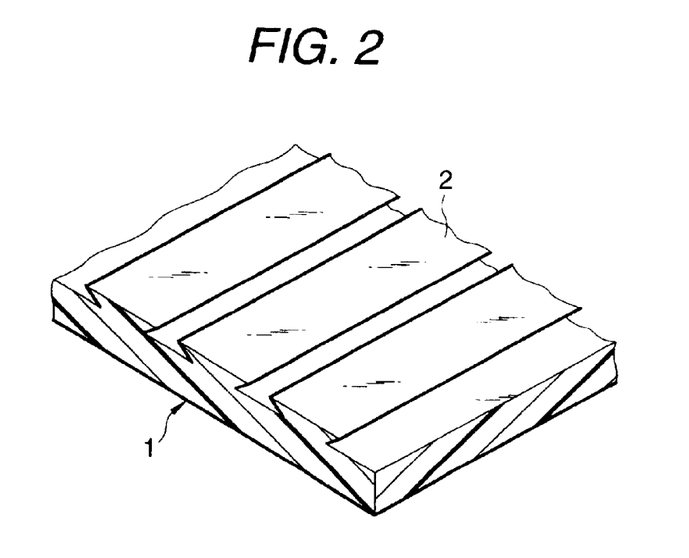
FIG. 2 is a perspective view showing a condition in which the cover has absorbed an impact.
Figure 3:
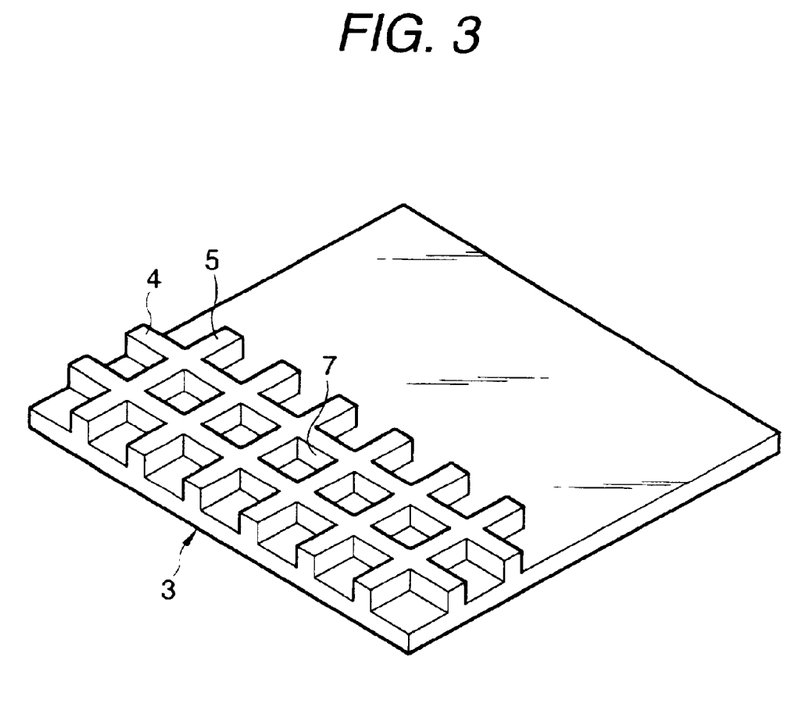
FIG. 3 is a perspective view showing a shock-absorbing structure of a battery cover which is a modified form of the structure of FIG. 1.

FIGS. 1 to 3 broadly show shock-absorbing structures of a battery cover forming the first embodiment of the present invention.

In the structure shown in FIG. 1, a plurality of juxtaposed parallel shock-absorbing ribs 2 are formed on the surface (outer surface) of the battery cover (hereinafter referred to as "cover") 1 made of a synthetic resin. The number of the ribs 2 may be two or may be large.

When an external impact is applied to the cover 1, the ribs 2 are crushed to absorb and relieve the impact as shown in FIG. 2. Therefore, the impact is prevented from acting on externally-threaded-type electrodes (not shown) of batteries, nuts, bus bars and so on disposed inside the cover 1, that is, provided at a casing, and these parts are safely protected by the cover 1. Since the electrodes are prevented from projecting from the cover, the short-circuiting will not occur. The ribs 2 achieve the shock-absorbing effect equal to or higher than that attained by increasing the wall thickness of the cover 1. At least two ribs 2 should be provided, but when the cover 1 need to be protected over a wider area thereof, it is necessary to provide more than two ribs 2.

In the case where an impact acts on the cover 1 in every direction, that is, directions indicated by broken lines a to c in FIG. 1, it is more effective to arrange shock-absorbing ribs 4 and 5 in a lattice-like or mesh-like fashion on a cover 1, as shown in FIG. 3. The transverse ribs 4 and the longitudinal ribs 5 perpendicularly intersect each other to form shock-absorbing portions.

The angle of intersection of the ribs 4 and 5 is not limited to a right angle. The number of the ribs 4, as well as the number of the ribs 5, may be two, or a large number of ribs 4 and 5 may be arranged transversely and longitudinally. In the example of FIG. 3, the ribs 4 and 5 are positively crushed upon application of an impact in every direction, thereby absorbing the impact. In any case, it is necessary that the ribs 2, 4 and 5 should be crushed in a compressing direction.

Spaces 6, each formed between the ribs 2 (in the example of FIG. 1), and spaces 7, each formed between the crossed ribs 4 and 5, are similar to holes formed in a resin material in a molding operation, and the resin moldability of the cover 1, 3 is very good. Namely, molding sink and warp will not occur during the molding, and also the molding time is reduced. The weight of the cover 1, 3 is reduced because of the formation of the spaces 6, 7 between the ribs.

The ribs 2, 4 and 5 are formed so as to be disposed at positions corresponding to the externally-threaded-type electrodes of the batteries. Alternatively, these ribs can be formed at other portions of the cover. The cover 1, 3 is fixed to the casing (not shown) by retaining members etc.

FIGS. 4 to 7 broadly show a shock-absorbing structure of a battery cover forming a second embodiment of the present invention.

Figure 4:
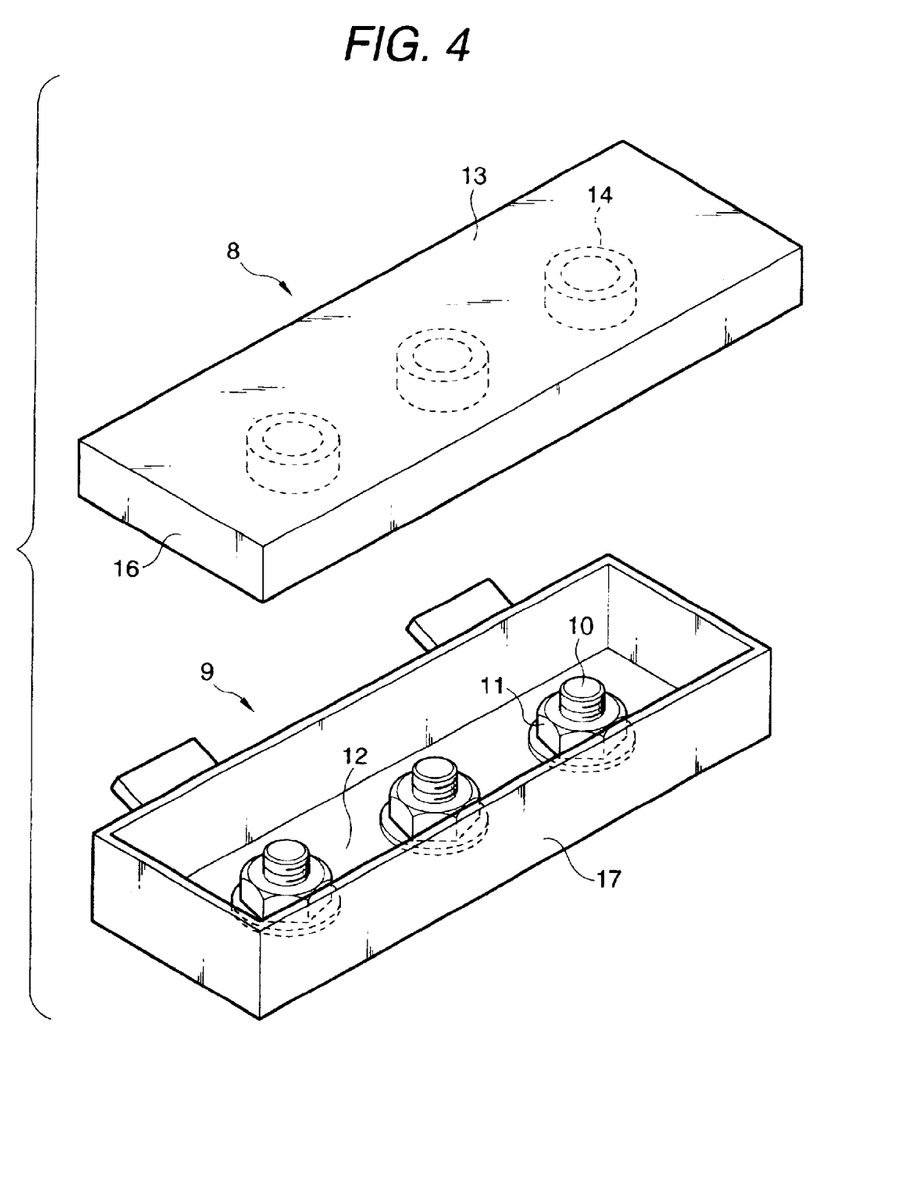
FIG. 4 is an exploded, perspective view of a shock-absorbing structure of a battery cover forming a second embodiment of the present invention.

In FIG. 4, reference numeral 8 denotes an insulative cover made of a synthetic resin, reference numeral 9 a casing made of a synthetic resin, reference numeral 10 an externally-threaded-type electrode of a battery (not shown), and reference numeral 11 a nut (fixing member) which fastens and connects a bus bar (not shown) and a wire with a terminal.

The cover 8 includes a top wall 13 and four side walls 16 while the casing 9 includes a bottom wall 12 and four side walls 17. The electrodes 10 extend respectively through round holes, formed through the bottom wall 12 of the casing 9, into the interior of this casing 9.

Figure 5:
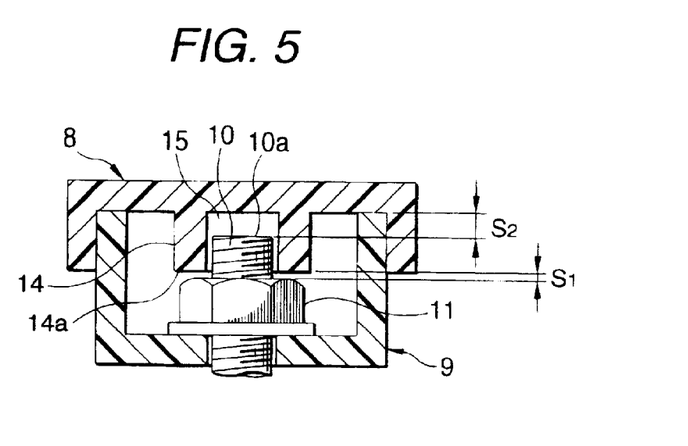
FIG. 5 is a cross-sectional view of the shock-absorbing structure of FIG. 4 in an assembled condition.

Annular projections (or circular ribs) 14, are formed integrally on a reverse side (inner surface) of the top wall 13 of the cover 8, and are opposed respectively to the nuts 11, as shown in FIG. 5. A distal end 14a of each projection 14 is in close proximity to the corresponding nut 11, with a narrow gap $S_1$ formed therebetween. A distal end portion of each electrode 10 is inserted in an internal space 15 of the corresponding projection 14, and a relatively-large gap $S_2$ is formed between the distal end 10a of the electrode 10 and the reverse side of the cover 8. The gap $S_1$ at the distal end of the projection is smaller than the gap $S_2$ at the distal end of the electrode.

Figure 6:
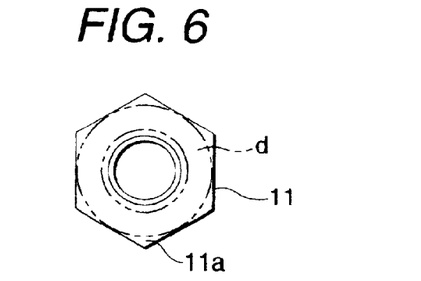
FIG. 6 is a plan view showing a condition in which a shock-absorbing projection interferes with a nut of the battery.
Figure 7:
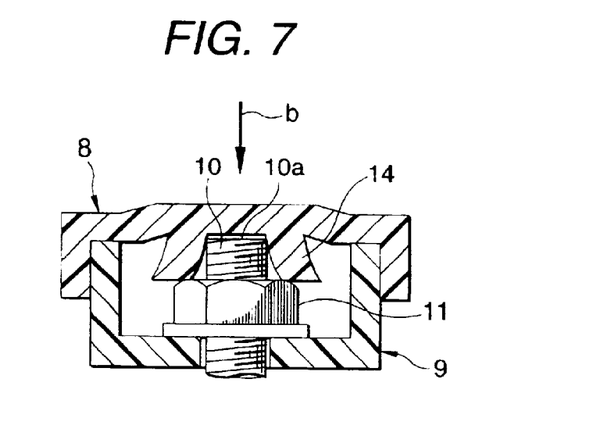
FIG. 7 is a cross-sectional view showing a condition in which an impact is absorbed.

The distal end 14a of the projection 14 can be come into contact with a distal end surface 11a of the nut 11 over the entire circumference thereof as indicated in phantom d in FIG. 6. Namely, in a condition shown in FIG. 5, when an impact is applied to the outer surface of the cover 8, the distal end 14a of the annular projection 14 first abuts against the distal end surface 11a of the nut 11, so that the projection 14 is compressed or crushed in the longitudinal direction as shown in FIG. 7, or is spread or deformed outwardly, thereby efficiently absorbing and relieving the impact b. Then, the distal end 10a of the electrode 10 abuts against the reverse side of the cover 8 to push the cover 8 in a direction opposite to the impact-applying direction, thereby deforming the cover in a slightly-projecting manner. In this condition, the impact b is completely absorbed, so that the electrode 10 will not break through the cover 8.

Therefore, the breakage of the cover 8 is prevented, and the electrode 10 does not project to the exterior, and therefore the breakage of the electrode 10 and the short-circuiting of the high-voltage batteries are prevented, and the nuts 11, the bus bars, the terminals, each having a power wire, and so on are prevented from deformation and breakage. If the impact is weak, only the projection 14 is buckled and deformed, and the cover 8 will not be deformed. Since the projection 14 has an annular shape, the impact is positively absorbed uniformly.

Since the distal end portion of the electrode 10 (projecting from the nut 11) is received in the internal space 15 of the insulative projection 14, the short-circuiting is less liable to occur even when a potential difference develops between the electrode 10 and the exterior of the cover 8. The cover 8 only has the annular projections 14 formed integrally therewith, and therefore the moldability of the cover is good, and molding sink and warp will not occur. And besides, as compared with the case where the wall thickness of the cover 8 is increased, the molding time is reduced, and the weight of the cover is reduced, and the cost thereof is reduced.

Instead of the nuts 11 serving as the fixing members, retaining rings (not shown) or other suitable members can be used. A slit can be formed in the annular (tubular) projection to adjust the shock-absorbing force. Each of the annular projections can be replaced by a plurality of bar-like projections arranged in an annular fashion around the electrode 10.

Figure 8:
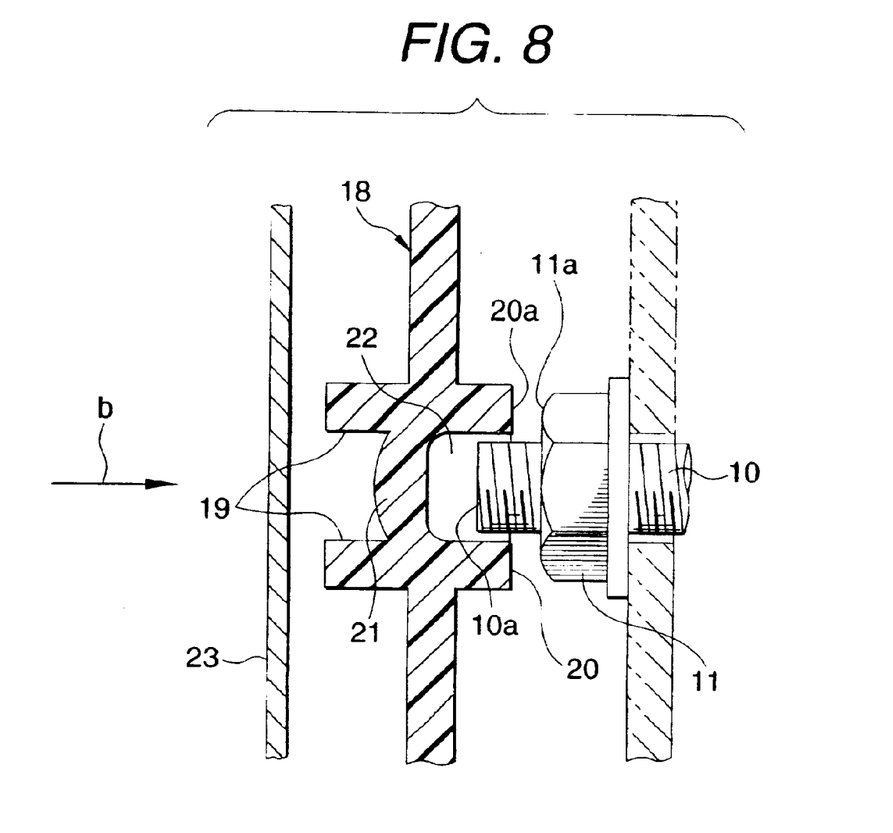
FIG. 8 is a cross-sectional view showing a shock-absorbing structure of a battery cover forming a third embodiment of the present invention.

FIG. 8 broadly shows a third embodiment having the features of the first and second embodiments.

A pair of shock-absorbing ribs 19 are formed on an outer surface of a cover 18 made of a synthetic resin, and annular projections 20 are formed on a reverse side of the cover 18, and the row of annular projections 20 and the ribs 19 are disposed substantially symmetrically with respect to the plane of the cover 18.

That portion of the cover 18, lying between the pair of ribs 19, is slightly reduced in thickness, and bulge portions 21 of a curved shape are formed at this portion of the cover 18. The inner diameter of each projection 20 is equal to the inner diameter of the bulge portion 21, and the inner peripheral surface of the projection 20 is continuous with the inner surface of the bulge portion 21. The depth of a bore (internal space) 22 of the projection 20 is larger than the distance between the distal end surface 11a of the nut 11 and the distal end 10a of the electrode 10, and therefore when an impact is applied, a distal end 20a of the projection 20 first abuts against the distal end surface 11a of the nut 11.

An impact is first applied to a vehicle body (iron sheet) 23, and then the iron sheet 23 abuts against the pair of ribs 19, and at the same time the projection 20 abuts against the nut 11. The ribs 19 and the projection 20 are crushed, and the impact is positively absorbed efficiently by the synergetic effect of the ribs 19 and the projection 20.

As a result, the interior of the cover 18 is positively protected. One pair of ribs 19 or more absorb the impact, and also dissipate the impact. The projection 20 is crushed or spread and deformed to absorb the impact, thereby particularly protecting the distal end portion of the electrode 10.

The ribs 19 and the projections 20 are formed on the opposite sides (outer and inner surfaces) of the cover 18, and are disposed substantially at the same portions of the cover (facing away from each other), and project away from each other. Therefore, the resin-molded cover can be easily removed from a mold, and the mold can be simplified in construction, and the cost of the cover 18 is reduced.

Instead of the pair of ribs, more than two parallel ribs or lattice-like ribs can be provided.

Figure 9:
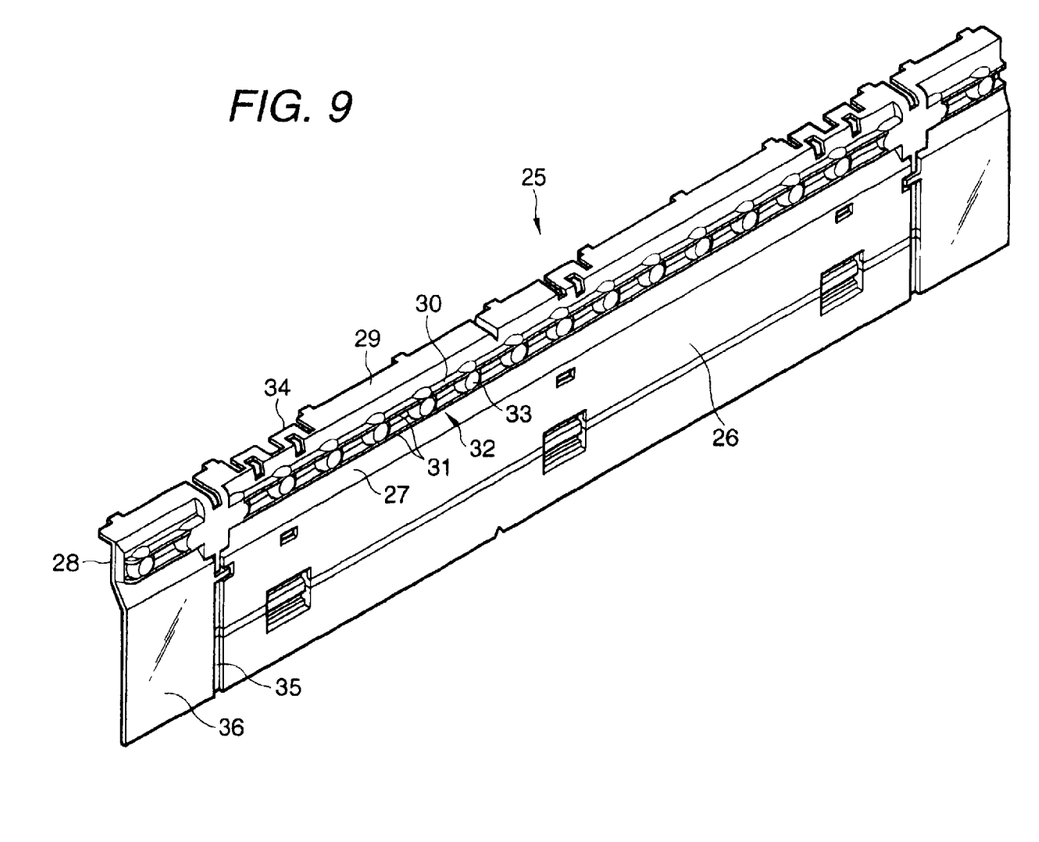
FIG. 9 is a perspective view showing a more specific form of shock-absorbing structure of the third embodiment.
Figure 10:
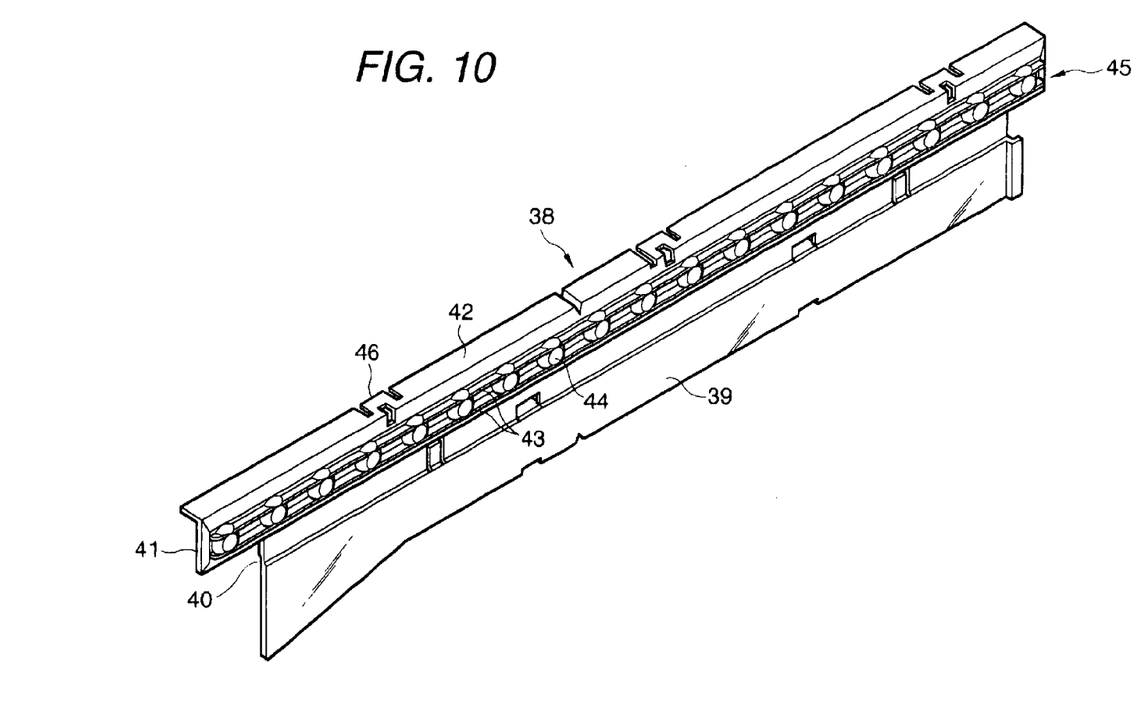
FIG. 10 is a perspective view showing another more specific form of shock-absorbing structure of the third embodiment.
Figure 11:
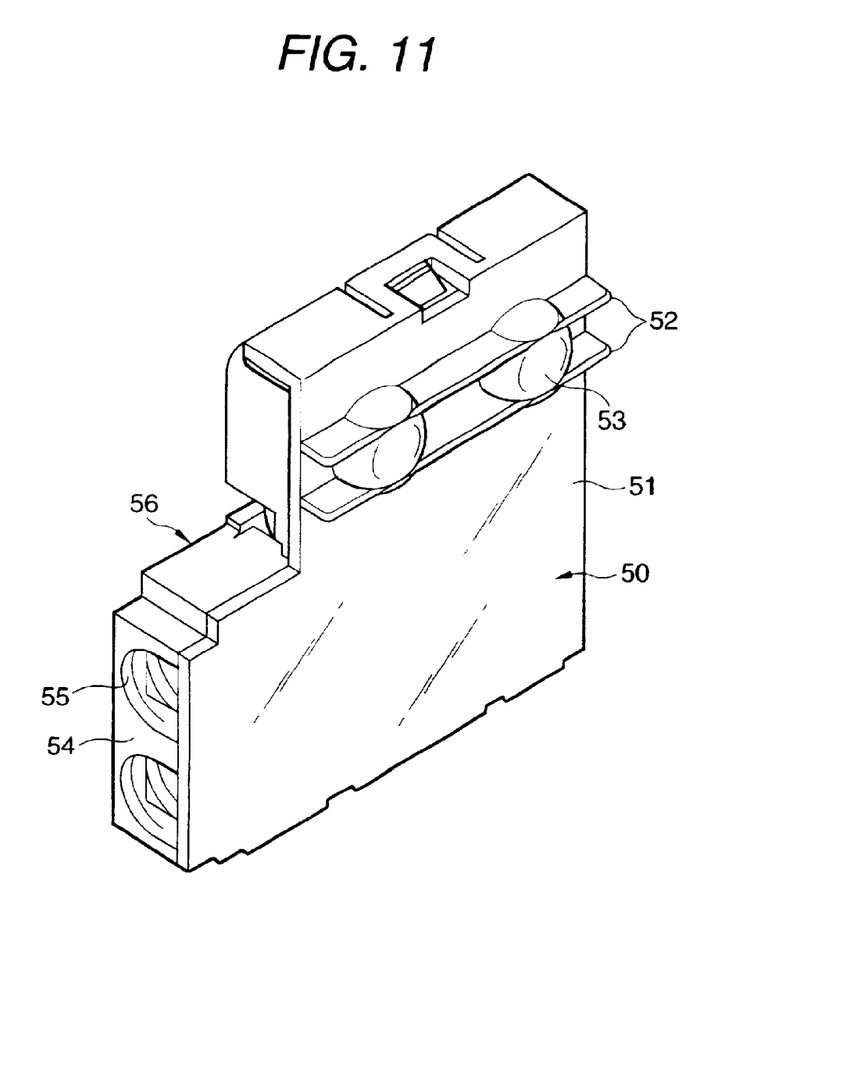
FIG. 11 is a perspective view showing a further more specific form of shock-absorbing structure of the third embodiment.

FIGS. 9 to 11 show a more detailed form of the third embodiment.

A cover 25, shown in FIG. 9, is made of a synthetic resin, and includes a flat plate-like, wide wall portion 26, a narrow wall portion 28, which is connected to an upper edge of the wall portion 26 through a slanting portion 27, and is recessed a step with respect to the wall portion 26, and an edge portion 29 extending perpendicularly from the wall portion 28. A bulge wall 30 of a rectangular cross-section is formed integrally on the narrow wall 28 (which is recessed a step as described above), and at least a pair of shock-absorbing ribs 31 are formed on an outer surface of the bulge wall 30 to provide an electrode-corresponding portion 32.

The pair of elongate ribs 31 are formed on the cover 25 over the entire length thereof, and the pair of ribs 31 are interconnected by bulge portions 33 of a substantially semi-spherical shape which are provided respectively for externally-threaded-type electrodes of batteries (not shown). The bulge portions 33 are arranged at equal intervals, and increase the bending strength and buckling strength of the ribs 31 so that the ribs 31 can be positively crushed in the direction of the height of the ribs 31 upon application of an external force (impact) in every direction. Also, the bulge portions 33 can be crushed together with the ribs 31 to absorb the impact more effectively.

Preferably, an annular projection (20) as shown in FIG. 8 is formed at the reverse side of each bulge portion 33 (that is, the reverse side of the wall portion 28), this annular projection being slightly larger in inner diameter than the bulge portion 33. The height of projecting of the projection (20) can be reduced by an amount corresponding to an amount of insertion of the distal end of the electrode (10) into an internal space of the bulge portion 33. The short projection (20) is crushed in a compressing direction to absorb an impact rather than spreads outwardly.

The distal end of the electrode of each battery (not shown) is disposed within the corresponding projection (20), and elongate distal end surfaces of the batteries (from which the electrodes project, respectively) are disposed close to the narrow wall portion 28, and extend vertically in FIG. 8. The electrodes are provided at upper portions of the batteries, respectively.

The cover 25 has frame-like retaining portions 34, and the cover 25 is retained relative to a casing (not shown), having bus bars, by these retaining portions 34 engaged respectively with engagement projections formed on the casing. Openable/closable portions 36 are formed integrally with opposite (right and left) ends of the cover 25 through respective hinges 35, and the right and left batteries of the battery block (which are connected respectively to terminals each having a power wire) are disposed in opposed relation to these portions 36, respectively.

A cover 38, shown in FIG. 10, includes a flat plate-like wall portion 39, a narrow wall portion 41 connected to an upper edge of the wall portion 39 through a thin hinge 40, and an edge portion 42 extending perpendicularly from the wall portion 41. At least a pair of ribs 43 and bulge portions 44 of a substantially semi-spherical shape are formed on an outer surface of the narrow wall portion 41 to provide an electrode-corresponding portion 45. The two wall portions 39 and 41 are disposed substantially in a common plane, and the electrode-corresponding portion 45 can be opened and closed through the hinge 40. In a closed condition of the electrode-corresponding portion 45, the edge portion 42 is retained relative to a casing (not shown) by at least one retaining mechanism 46, and the electrodes and so on are received within and protected by the cover 38. Preferably, a shock-absorbing projection(designated by reference numeral 20 in FIG. 8) is formed at the reverse side of each bulge portion 44.

At the time of a vehicle collision, the pair of ribs 43 and the bulge portions 44 are crushed to absorb an impact. Even when the bulge portion 44 is crushed, a hole will not be formed through the bulge portion 44. The height of the bulge portions 44 is substantially equal to the height of the ribs 43. In the case where the projections (20) are provided, the impact can be further absorbed by the crushing of the projections (20).

A cover 50, shown in FIG. 11, is used for two batteries connected together. This cover 50 includes at least a pair of short shock-absorbing ribs 52, formed on an upper portion (FIG. 11) of a flat plate-like top wall 51, and a pair of bulge portions 53 of a substantially semi-spherical shape which are formed on the upper portion (FIG. 11) of the top wall 51, and interconnect the two ribs 52. Preferably, as described above, an annular projection (designated by reference numeral 20 in FIG. 8) is formed at the reverse side of each bulge portion 54.

The cover 50 in its closed condition is attached to a casing 56, and power wire-leading holes 55 are formed through a side wall 54 of the casing 56. Electrode-connecting bus bars and/or terminals each with a power wire are received within the casing. Instead of the pair of ribs 52 and the bulge portions 53, a plurality of crossed or lattice-like ribs can be provided as shown in FIG. 3. The shock-absorbing structures of FIGS. 9 to 11 are basically identical in construction and effects.

What is claimed is:

1. A shock-absorbing structure of a battery cover, comprising:
    a battery cover which protects at least one battery; and
    a plurality of shock-absorbing ribs formed on an outer surface of the battery cover,
    wherein the plurality of ribs are arranged parallel to each other.

2. A shock-absorbing structure of a battery cover, comprising:
    a battery cover which protects at least one battery; and
    a plurality of shock-absorbing ribs formed on an outer surface of the battery cover,
    wherein the plurality of ribs are crossed in a lattice-like manner.

3. A shock-absorbing structure of a battery cover, comprising:
    a battery cover which protects at least one battery;
    a plurality of shock-absorbing ribs formed on an outer surface of the battery cover;
    at least one fixing member engaged with an electrode of the at least one battery; and
    at least one projection which is formed on an inner surface of the battery cover and can abut against the at least one fixing member.

4. A shock-absorbing structure according to claim 3, wherein the at least one projection has an annular shape to form a hollow portion therein, and a distal end portion of the electrode is received in the hollow portion of the at least one projection.

5. A shock-absorbing structure according to claim 3, wherein a gap between the at least one projection and the at least one fixing member is smaller than a gap between the electrode and the battery cover.

6. A shock-absorbing structure according to claim 4, wherein a gap between the at least one projection and the at least one fixing member is smaller than a gap between the electrode and the battery cover.

7. A shock-absorbing structure according to claim 3, wherein the plurality of ribs and the at least one projection are disposed substantially symmetrically with respect to a plane of the battery cover.

8. A shock-absorbing structure of a battery cover, comprising:
   a battery cover which protects at least one battery; and
   a plurality of shock-absorbing ribs formed on an outer surface of the battery cover,
   wherein the plurality of ribs are interconnected by at least one bulge portion formed on the battery cover.

9. A shock-absorbing structure according to claim 8, wherein the at least one bulge portion and the plurality of ribs project substantially to the same height.

10. A shock-absorbing structure of a battery cover, comprising:
    a battery cover which protects at least one battery;
    at least one fixing member engaged with an electrode of the at least one battery; and
    at least one projection which is formed on an inner surface of the battery cover and can abut against the at least one fixing member,
    wherein the projection extends towards the at least one fixing member,
    wherein a gap between the at least one projection and the at least one fixing member is smaller than a gap between the electrode and the battery cover.

11. A shock-absorbing structure of a battery cover, comprising:
    a battery cover which protects at least one battery;
    at least one fixing member engaged with an electrode of the at least one battery; and
    at least one projection which is formed on an inner surface of the batter cover and can abut against the at least one fixing member,
    wherein the projection extends towards the at least one fixing member,
    wherein that at least one projection has an annular shape to form a hollow portion therein, and a distal end portion of the electrode is received in the hollow portion of the at least one projection,
    wherein a gap between the at least one projection and the at least one fixing member is smaller than a gap between the electrode and the battery cover.

12. A shock-absorbing structure of a battery cover, comprising:
    a battery cover which protects at least one battery;
    at least one fixing member engaged with an electrode of the at least one battery;
    at least one projection which is formed on an inner surface of the battery cover and can abut against the at least one fixing member,
    wherein the projection extends towards the at least one fixing member; and
    a plurality of shock-absorbing ribs formed on an outer surface of the battery cover.

13. A shock-absorbing structure according to claim 12, wherein the plurality of ribs are arranged parallel to each other.

14. A shock-absorbing structure according to claim 12, wherein the plurality of ribs are crossed in a lattice-like manner.

15. A shock-absorbing structure according to claim 12, wherein the plurality of ribs and the at least one projection are disposed substantially symmetrically with respect to a plane of the battery cover.

16. A shock-absorbing structure according to claim 12, wherein the plurality of ribs are interconnected by at least one bulge portion formed on the battery cover.

17. A shock-absorbing structure according to claim 16, wherein the at least one bulge portion and the plurality of ribs project substantially to the same height.

18. The shock-absorbing structure of a battery cover according to claim 4, wherein the annular shape is in the form of a circular rib.

19. The shock-absorbing structure of a battery cover according to claim 3, wherein the at least one projection and the plurality of ribs are disposed substantially at the same portion of the battery cover, such that the at least one projection and the plurality of ribs face away from each other.

* * * * *